(12) United States Patent
Norman, III et al.

(10) Patent No.: US 10,875,490 B2
(45) Date of Patent: Dec. 29, 2020

(54) HYBRID AIRBAG INFLATOR

(71) Applicant: Key Safety Systems, Inc., Sterling Heights, MI (US)

(72) Inventors: Kent Norman, III, St. Petersburg, FL (US); William F. McLeod, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 56 days.

(21) Appl. No.: 15/957,453

(22) Filed: Apr. 19, 2018

(65) Prior Publication Data
US 2019/0322239 A1   Oct. 24, 2019

(51) Int. Cl.
*B60R 21/272*   (2006.01)
*B60R 21/26*    (2011.01)
*B60R 21/264*   (2006.01)
*B60R 21/017*   (2006.01)

(52) U.S. Cl.
CPC .......... *B60R 21/272* (2013.01); *B60R 21/017* (2013.01); *B60R 21/2644* (2013.01); *B60R 2021/26029* (2013.01); *B60R 2021/2642* (2013.01); *B60R 2021/26064* (2013.01)

(58) Field of Classification Search
CPC ..... B60R 21/017; B60R 21/26; B60R 21/264; B60R 21/272; B60R 2021/26029; B60R 2021/2642
See application file for complete search history.

(56) References Cited

U.S. PATENT DOCUMENTS

| 3,831,973 | A | * | 8/1974 | Meacham | B60R 21/2032 |
| | | | | | 280/731 |
| 3,891,233 | A | * | 6/1975 | Damon | B60R 21/26 |
| | | | | | 280/737 |
| 3,901,530 | A | * | 8/1975 | Radke | B60R 21/217 |
| | | | | | 280/736 |
| 3,960,390 | A | * | 6/1976 | Goetz | B60R 21/272 |
| | | | | | 280/731 |
| 5,378,018 | A | * | 1/1995 | Ketterer | B60R 21/272 |
| | | | | | 280/737 |

(Continued)

FOREIGN PATENT DOCUMENTS

DE   1906290 A1   10/1969
EP   0844148 A1    5/1998

*Primary Examiner* — Barry Gooden, Jr.
(74) *Attorney, Agent, or Firm* — Meunier Carlin & Curfman LLC

(57) ABSTRACT

A hybrid airbag inflator (100, 200) has a disk-shaped pressure vessel having a central axis with a domed upper housing portion (20) with a sealed exhaust port (22) for releasing inflation gases and a domed lower body portion (10) welded to the domed upper housing portion (20). The domed lower body portion (10) has one or more protrusions (12) extending from an outer or exterior surface positioned offset from the center axis. At least one of the protrusions (12) houses an igniter assembly (60) with accessible electrical connections (61, 63). The disk-shaped pressure vessel inflator (100, 200) contains gas generant pellets (2) and a quantity of pressurized inert gas (1) for inflating an airbag. The combination of the protrusions (12) and domed lower body portion (10) has a unique profile of a petaloid shape. Optionally, the domed upper housing portion (20) can also have the petaloid shape.

23 Claims, 16 Drawing Sheets

(56) References Cited

U.S. PATENT DOCUMENTS

| | | | |
|---|---|---|---|
| 5,516,147 A * | 5/1996 | Clark | B60R 21/272 280/737 |
| 5,558,367 A | 9/1996 | Cuevas | |
| 5,601,308 A * | 2/1997 | Cuevas | B60R 21/272 222/3 |
| 5,613,706 A * | 3/1997 | Parker | B60R 21/2644 102/202 |
| 5,634,661 A | 6/1997 | Dahl et al. | |
| 5,685,558 A * | 11/1997 | Cuevas | B60R 21/203 280/728.2 |
| 5,763,817 A | 6/1998 | Renfroe et al. | |
| 5,778,509 A * | 7/1998 | Hamilton | B60R 21/272 280/736 |
| 5,803,494 A * | 9/1998 | Headley | B60R 21/264 280/736 |
| 5,851,027 A | 12/1998 | Digiacomo et al. | |
| 5,907,120 A * | 5/1999 | Mooney | B60R 21/264 102/521 |
| 5,979,936 A | 11/1999 | Moore et al. | |
| 6,019,389 A * | 2/2000 | Burgi | B60R 21/264 280/736 |
| 6,036,222 A * | 3/2000 | Holmes | B60R 21/2035 280/728.2 |
| 6,168,200 B1 | 1/2001 | Griest et al. | |
| 6,189,922 B1 * | 2/2001 | Parks | B60R 21/272 280/735 |
| 6,213,503 B1 | 4/2001 | Zimbrich et al. | |
| 6,217,064 B1 | 4/2001 | Schwuchow et al. | |
| 6,447,007 B1 | 9/2002 | Digiacomo et al. | |
| 6,474,684 B1 | 11/2002 | Ludwig et al. | |
| 6,572,142 B1 * | 6/2003 | Iyoshi | B60R 21/272 280/737 |
| 6,682,708 B1 * | 1/2004 | Zeuner | B60R 21/272 102/530 |
| 9,550,471 B1 * | 1/2017 | Quioc | C06D 5/00 |
| 2003/0047925 A1 * | 3/2003 | Edwards, II | B60R 21/2644 280/741 |
| 2003/0234526 A1 * | 12/2003 | Quioc | B60R 21/2644 280/736 |
| 2005/0029785 A1 | 2/2005 | Bilbrey et al. | |
| 2006/0113780 A1 * | 6/2006 | Goetz | B60R 21/272 280/736 |
| 2006/0157960 A1 * | 7/2006 | Matsuda | B60R 21/272 280/736 |
| 2008/0136152 A1 * | 6/2008 | McFarland | B60R 21/2644 280/736 |
| 2011/0168726 A1 | 7/2011 | Silva Viera et al. | |
| 2011/0221176 A1 * | 9/2011 | Bierwirth | B60R 21/2644 280/741 |
| 2012/0235392 A1 * | 9/2012 | Smith | B60R 21/261 280/741 |
| 2016/0167617 A1 * | 6/2016 | Wang | B60R 21/276 701/45 |
| 2018/0215341 A1 * | 8/2018 | Izuma | B60R 21/2644 |
| 2019/0323662 A1 * | 10/2019 | Norman, III | F17C 13/06 |

* cited by examiner

HYBRID AIRBAG INFLATOR

FIELD OF THE INVENTION

The present invention relates to airbag inflators, more particularly to a hybrid inflator containing pressurized gas and gas generant pyrotechnic material.

BACKGROUND OF THE INVENTION

Airbag inflators have been used to provide inflation gases to fill an inflatable cushion to protect occupants of motor vehicles for years. These inflators are designed to be compact in size while still having a sufficient size to store enough gas generating material to fill the airbag cushion on inflation.

Some inflators use compressed inert gas, others use pyrotechnic gas generant materials, typically in the form of pellets, while still others use a combination of both pressurized gas and pyrotechnic materials to inflate the cushion. These combination inflators are commonly referred to as hybrids.

The present invention provides a unique housing structure that provides an improved hybrid inflator in a compact shape with superior assembly features that has high reliability and accommodates a variety of internal configurations to adjust the inflation gas mass flow and temperature profiles for specific applications over a wide range of vehicle requirements while achieving a reduced cost to manufacture compared to older hybrid inflator designs.

The hybrid inflator of the present invention as shown and described hereinafter affords a greatly improved and easily achieved assembly of a very high reliability inflator structure.

SUMMARY OF THE INVENTION

A hybrid airbag inflator has a disk-shaped pressure vessel having a central axis with a domed upper housing portion with a sealed exhaust port for releasing inflation gases and a domed lower body portion welded to the domed upper housing portion. The domed lower body portion has one or more protrusions extending from an outer or exterior surface positioned offset from the center axis. At least one of the protrusions houses an igniter assembly with accessible electrical connections. The disk-shaped pressure vessel contains gas generant pellets and a quantity of pressurized inert gas for inflating an airbag.

The hybrid airbag inflator further has a diffuser cap for receiving and encircling the domed upper housing portion. The diffuser cap is fixed to the pressure vessel and has a perforated circular wall, a closed top and a mounting flange for attaching the pressure vessel to a vehicle structure. Preferably, the domed lower portion has three protrusions equally spaced apart at 120 degrees around and offset from the axis. Each protrusion extending vertically from the outer or exterior surface by a vertical distance equal to the other protrusions forming a petaloid.

BRIEF DESCRIPTION OF THE DRAWINGS

The invention will be described by way of example and with reference to the accompanying drawings in which.

DETAILED DESCRIPTION OF THE INVENTION

Figure 16:
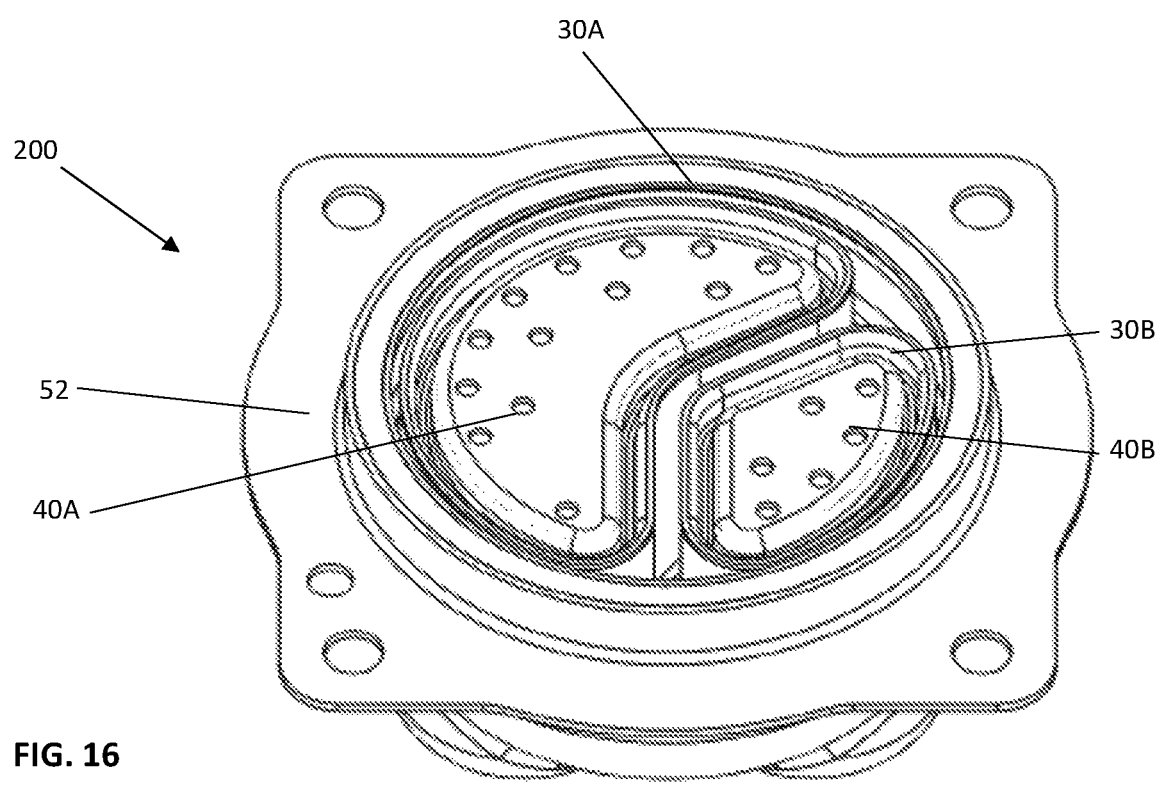
FIG. 16 is a view showing the top of the generant cup of the dual stage second embodiment.
Figure 17:
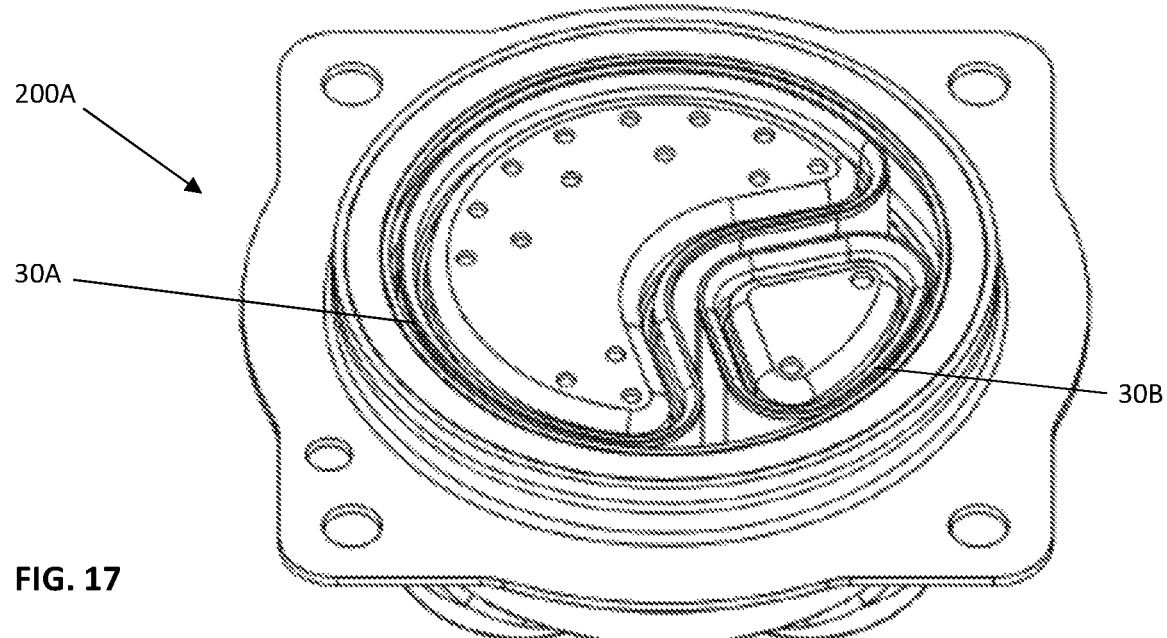
FIG. 17 is a first alternative geometry of the second embodiment.
Figure 18:
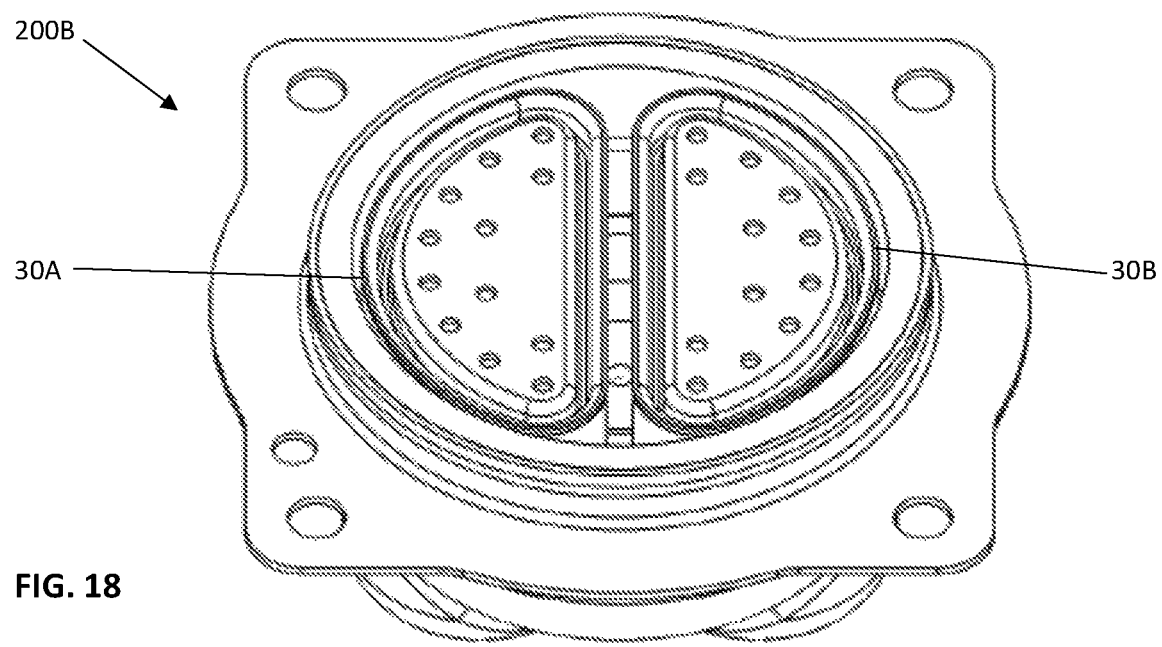
FIG. 18 is a second alternative geometry of the second embodiment.

With reference to the drawings, FIGS. 1-7 and 15 depict a first embodiment of a single stage hybrid inflator 100 of the present invention. FIGS. 8-14 and 16 represent a second embodiment of a dual stage hybrid inflator 200 of the present invention. FIGS. 17 and 18 are variations of the second embodiment showing how the dual stage hybrid inflator 200 can be modified to accommodate different design criteria for different vehicle applications. Many of the same components of the first embodiment single inflator 100 are used in the second embodiment dual inflator 200. Accordingly, where possible the same reference numerals identifying these common elements are the same, as described herein.

The external size and geometry of the structure of the inflators 100, 200 for the most part are also the same allowing for a cost effective way to make the single stage hybrid inflator 100 or dual stage hybrid inflator 200 employing many common components that are configured to be assembled in a reliable and cost effective way to make either style of inflator.

Figure 1:
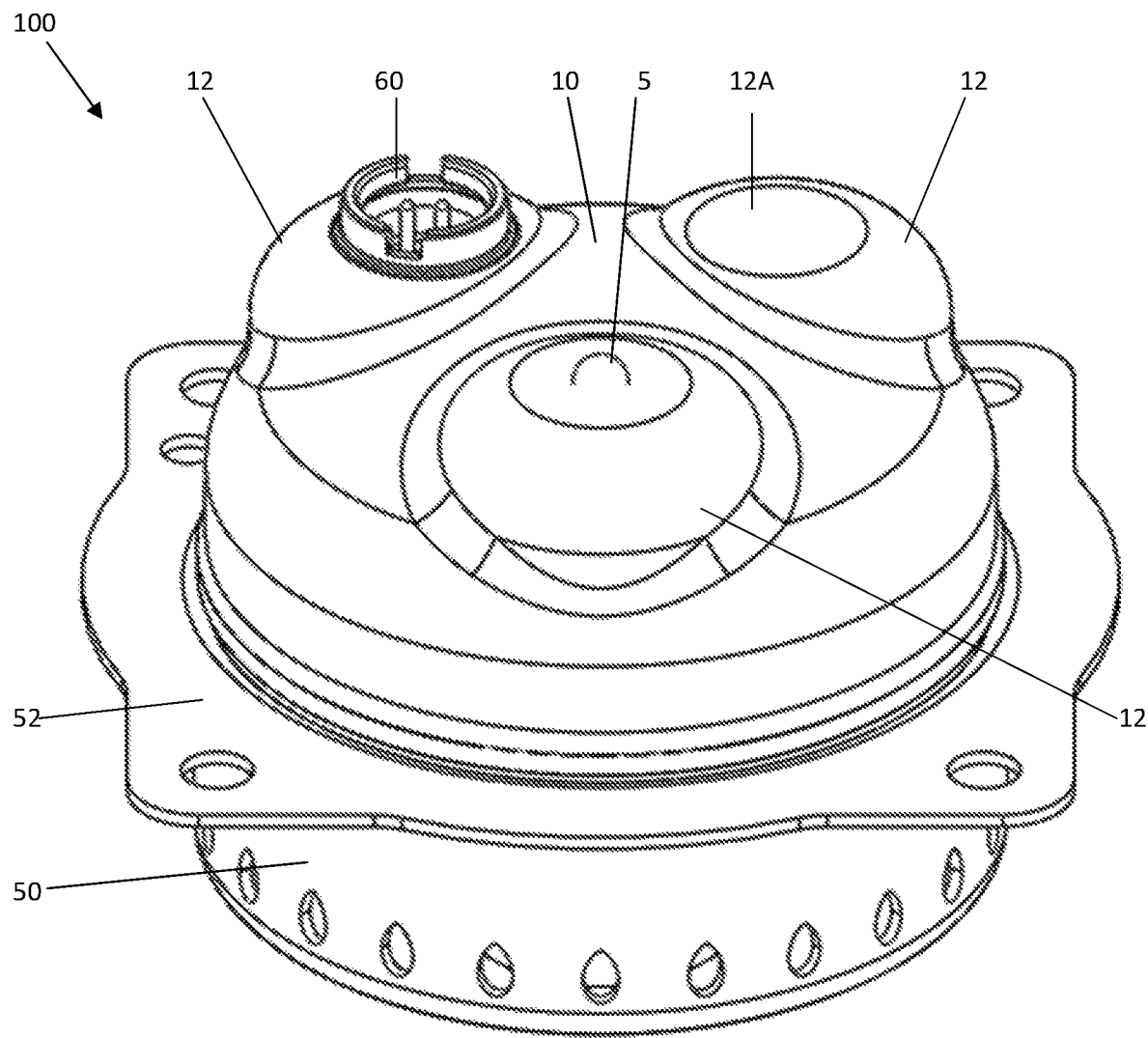
FIG. 1 is a first embodiment of the invention showing a perspective view of a single stage inflator made in accordance to the present invention.

With reference to FIG. 1, a single stage hybrid inflator 100 is shown rotated such that the domed lower body portion 10 is clearly visible, the domed upper housing portion being concealed by a diffuser 50 with a mounting flange 52.

Figure 2:
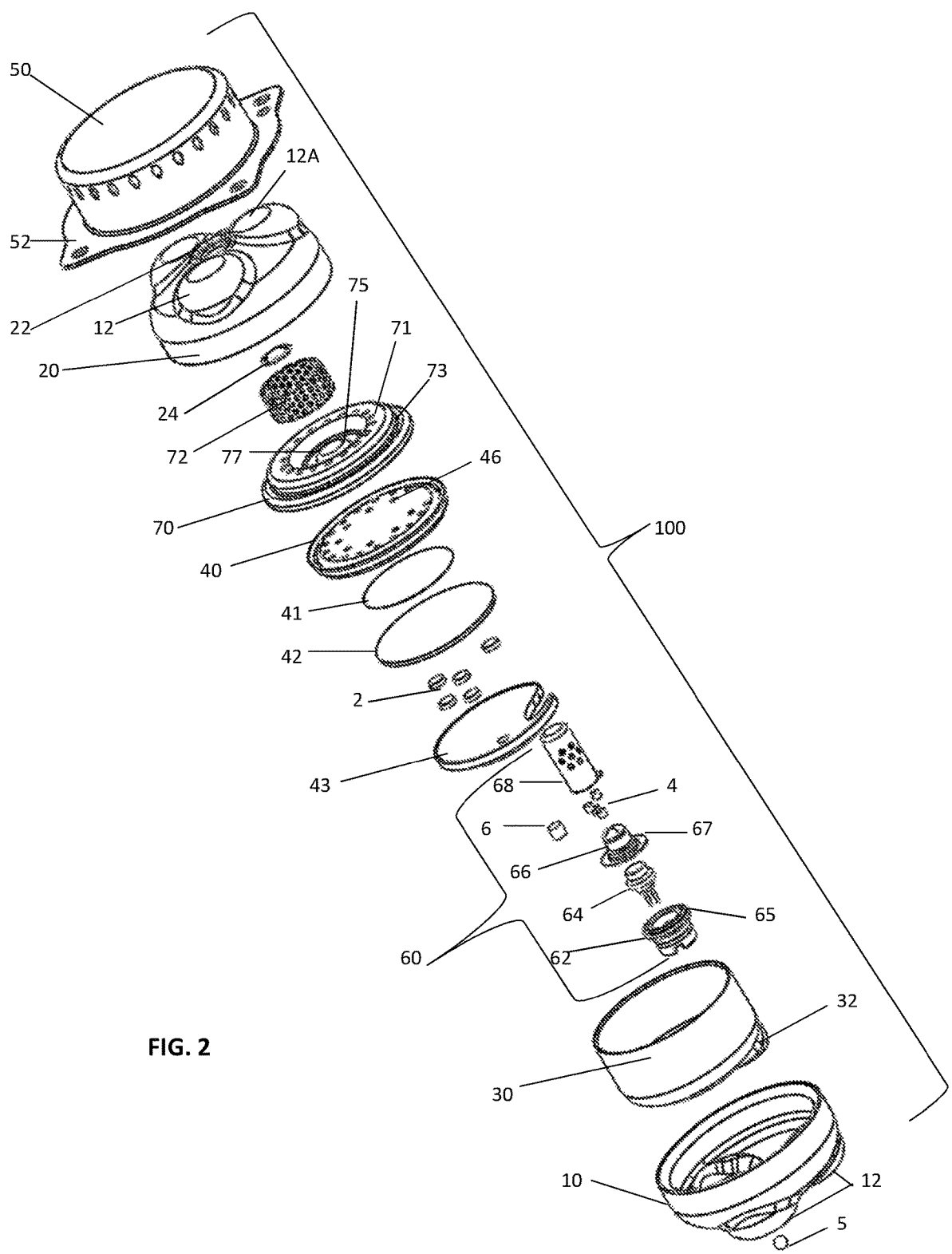
FIG. 2 is an exploded perspective view of the single stage inflator showing the various components of the inflator of the present invention.

The inflator 100 of FIG. 1 is shown in an exploded view in FIG. 2 which illustrates all the components of the device. As shown, going from the lower right of the drawing toward the upper left, the various components and their function are described as follows. A fill ball 5 is shown. The fill ball 5 is used to seal a fill opening or port on a domed lower body portion 10. The fill ball 5 can be made of a metal material that is resistance welded to the domed lower body portion 10 after inert gas 1 is placed into the inflator under high pressure. The inert gas 1 is typically a mixture of Argon and Helium. Directly above the domed lower body portion 10 is a generant chamber 30 with an open tube 32 for receiving an igniter assembly 60. The open tube 32 is aligned with an opening of one of the protrusions 12 extending from the exterior surface of the lower housing. The igniter assembly 60 has several components. An igniter holder 62 for receiving an igniter 64. The igniter holder 62 can be laser welded or otherwise affixed to the generant chamber 30. The igniter 64 has a pair of electrical connectors 61, 63 which are provided to connect to an electrical wiring connection (not shown) to receive an electrical current when the device is activated causing the igniter 64 or squib to fire a small propellant charge stowed in the igniter 64. An igniter cap 66 encircles and holds the igniter 64 and can be resistance welded or otherwise affixed along flanged surfaces 65, 67 to the igniter holder securely fixing the igniter. Enhancer pellets or tablets 4 are stowed inside the enhancer chamber 68 above the igniter cap 66. The enhancer tablets 4 are small charges of combustible material used to ignite gas generant tablets 2 stored inside the generant chamber 30. For sound dampening and noise suppression, a lower cushion 43 of material is provided that sits in the bottom of the gas generant chamber 30. Above that is an upper cushion 42 of material. The gas generant is preferably compactly packed between the cushioning materials 42, 43 to minimize rattling. As shown, one autoignition tablet 6 is also placed in the generant chamber 30. The autoignition tablet 6 is a safety feature that will ignite when the device is exposed to a high temperature such as a fire. When autoignition tablet 6 ignites, it sets off the gas generant tablets 2 and the enhancer tablets 4 to prevent a premature explosion. Above the upper cushion 42 is a generant cap 40 with a plurality of holes 46 sealed by a rupturable disk of cap foil 41. The cap foil 41 seals the holes 46 of the cap 40 and the gas generant chamber 30 when the generant cap 40 is pressed onto the generant chamber 30. Above the cap 40 is a baffle 70. The baffle 70 has an elevated ring 73 with a plurality of openings or holes 71. In a depression 75 formed by the ring 73 is placed a perforated ring 72 with a cylindrical wall with a large number of holes. The center opening of the perforated ring 72 is set over a small centering protrusion 77 of the baffle 70. A domed upper housing portion 20 with a large center exhaust port 22 is sealed by a burst disk 24. The domed upper housing portion 20 is preferably friction welded or otherwise affixed to the domed lower housing 10 to form the inflator 100. Encircling the domed upper housing portion 20 is the diffuser 50 with a mounting flange 52. The diffuser 50 can be laser welded or otherwise affixed to the domed upper housing portion 20 to complete the inflator 100 assembly. When so constructed, the inflator is made into a single stage hybrid inflator 100 having pressurized inert gas and pyrotechnic gas generant materials.

Figure 3:
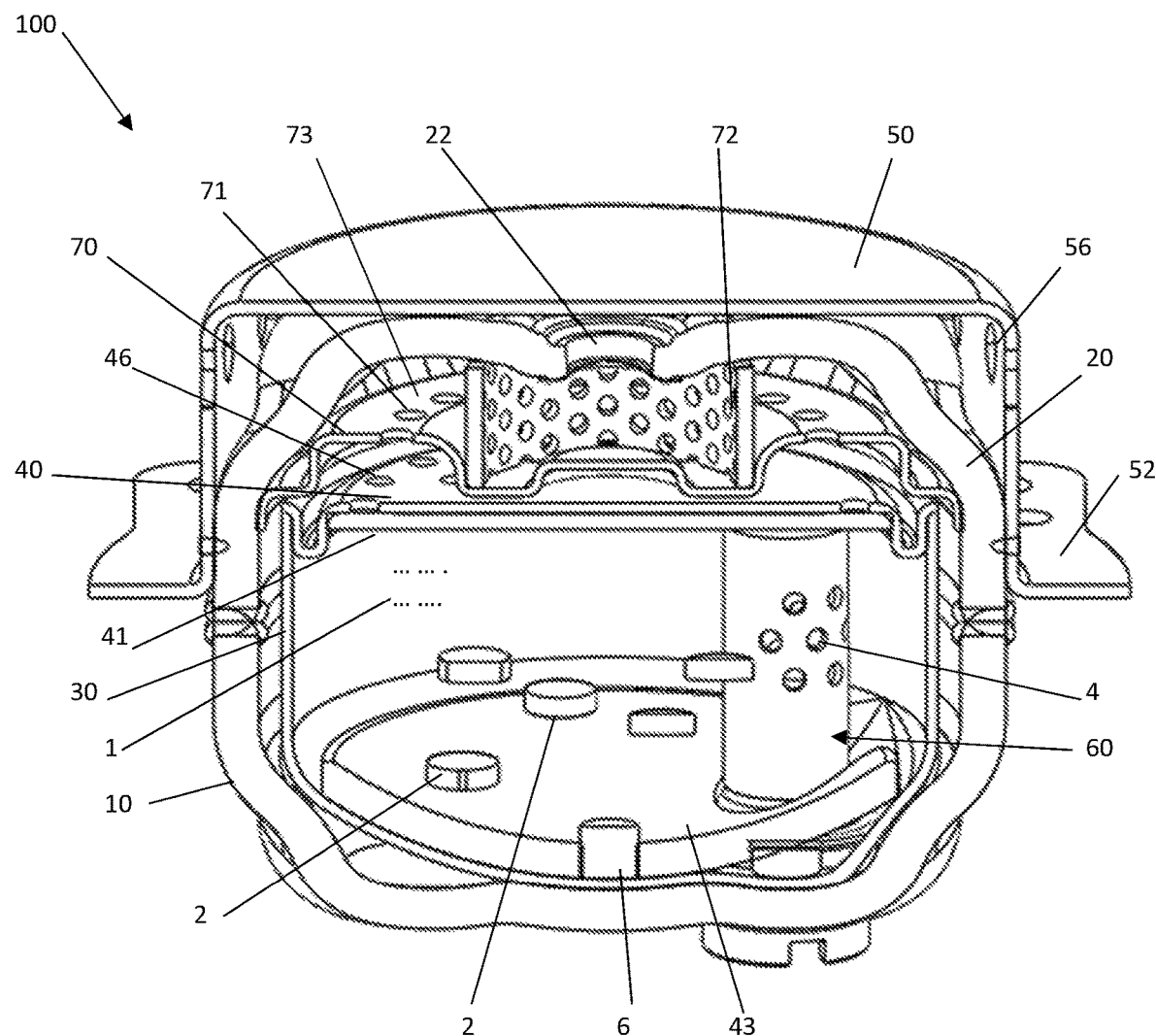
FIG. 3 is a cross-sectional perspective view of the inflator of FIG. 1 taken along a center plane through an axis A of the device.

With reference to FIG. 3, a cross-sectional view of the hybrid inflator 100 of the present invention is shown. As shown, the domed lower body portion 10 is butt welded to the domed upper housing portion 20 defining a cavity or chamber within the housings in which the generant chamber 30 is positioned. The generant chamber 30 is shown with a plurality of gas generant pellets or tablets 2 disposed within the chamber 30. Only a small number of pellets 2 are shown for illustration purposes, however, it can be presumed that the chamber 30 will be filled with the pellets 2. Below the pellets 2 is the cushion sound absorbing device 43 that prevents the pellets 2 from rattling and generating noise. As shown the entire gas generant chamber 30 is sealed and filled with an inert gas 1, as illustrated by dots. An autoignition tablet 6 is placed in the bottom of the chamber 30. This autoignition tablet 6, as previously discussed, is a safety feature which prevents premature detonation of the generant pellets 2 in the event of exposure to excessive heat. On the right-hand side of the cross-sectional view is shown the igniter assembly 60. The igniter assembly 60 internally has a plurality of pellets called enhancer tablets 4. These enhancer tablets 4 are activated when the igniter sends an electrical signal and a small charge in the igniter displaces or ruptures the igniter cap 66 thereby igniting the enhancer tablets 4 and thereafter the gas generant tablets 2. At that point, an internal pressure is built up and a cap foil 41 in the top of the gas generant chamber 30 abutting the cap 40 bursts along the plurality of holes allowing the inert gas 1 and the generated gas to displace and go out through a baffle 70. The baffle 70 is shown with a raised annular, toroidal cavity 73 that receives the discharge gases and releases the gases through holes 71 in the top of the baffle 70 which will then be directed to an exhaust port 22 which is encircled by a perforated ring 72 which allows the gases to enter radially and turn axially to then exit through the exhaust port 22 when a burst disk 24 sealing the opening 22 is ruptured. Thereafter, the gases will flow directly into the diffuser 50 and radially outward around the circumference of the diffuser 50 through the hole openings 56 in a thrust neutral fashion to inflate an airbag (not illustrated).

Figure 4:
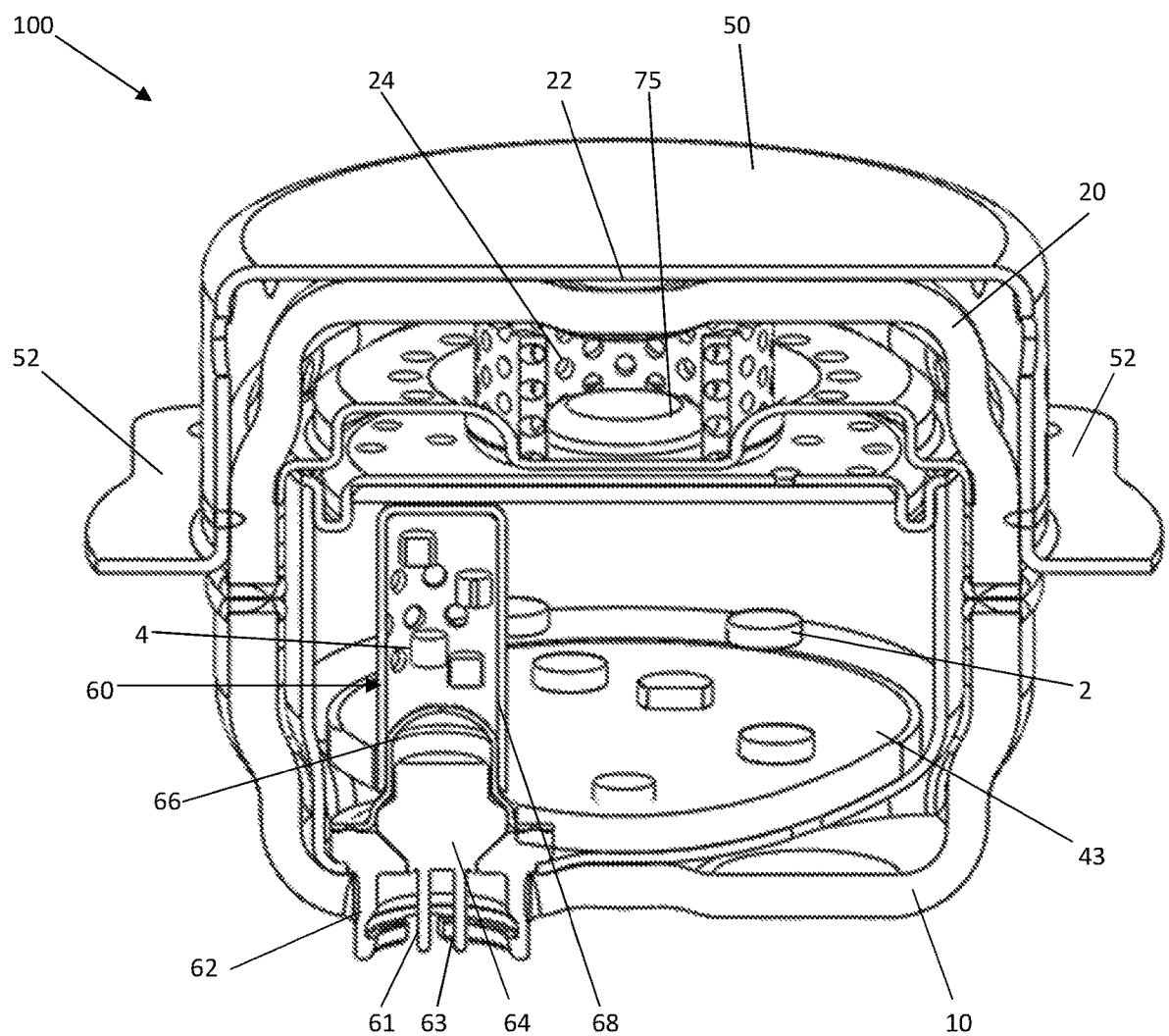
FIG. 4 is a second cross-section view of the inflator of FIG. 1 taken along a plane passing through an igniter of the inflator offset form the inflator axis.

To better illustrate this, FIG. 4 shows the igniter assembly 60 and electrical connectors 61, 63 that will be connected to a wiring harness to receive a sent signal in the event of a crash to then ignite the igniter 64 sending a small charge to burst the igniter cap 66 and thereafter ignite the enhancer tablets 4 in the enhancer chamber 68.

Figure 5:
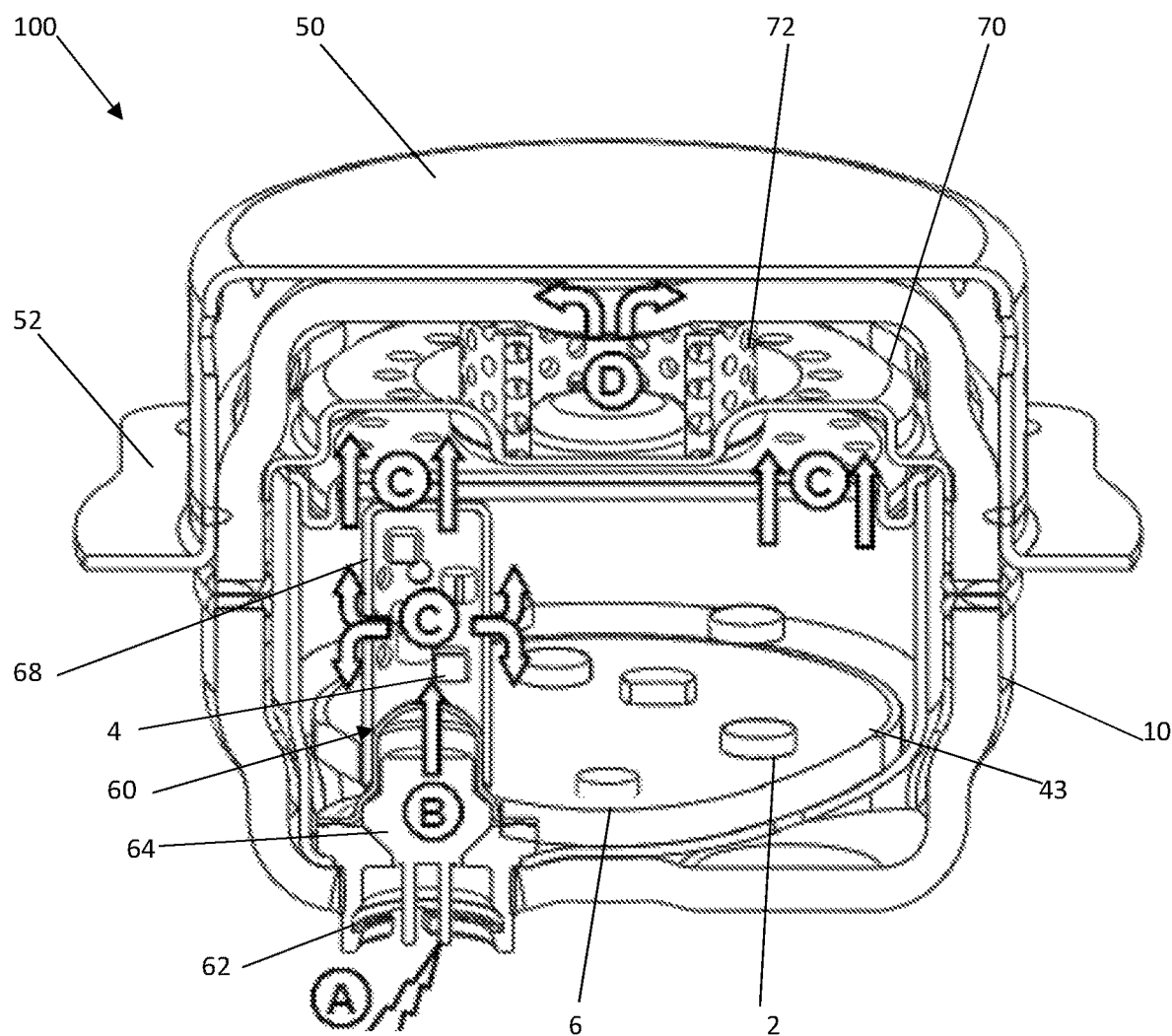
FIG. 5 is the same view as FIG. 4 with the ignition sequence shown depicting the sequential timing of the device when activated, the arrows showing the direction of gas flow.
Figure 6:
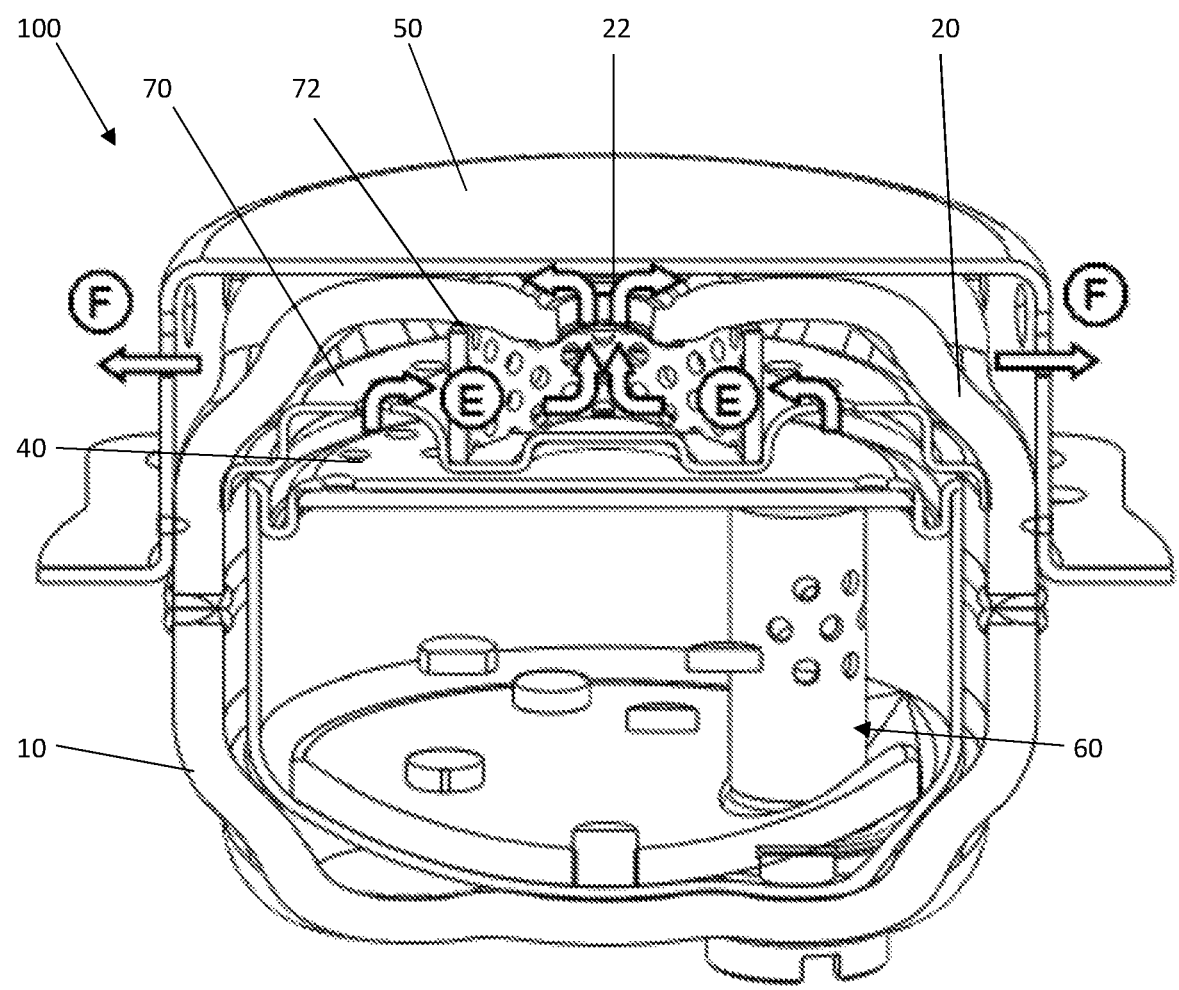
FIG. 6 is the view of FIG. 3 showing the gas flow directed to the exit port and through the opening flowing out of the diffuser when activated.

With reference to FIG. 5, the gas flow is shown in the circumstance of a signal being sent. The signal is being shown in a circle as location A and directing a secondary location B of the igniter 64 which then ignites the enhancer tablets 4 at location C expelling the gas out the enhancer chamber 68, when this occurs the cap foil 41 ruptures and the gas flows as previously described through the baffle 70 towards the exhaust port 22 at location D where burst disk 24 is ruptured allowing the gases to escape at locations E and F as shown in FIGS. 5 and 6.

Figure 7:
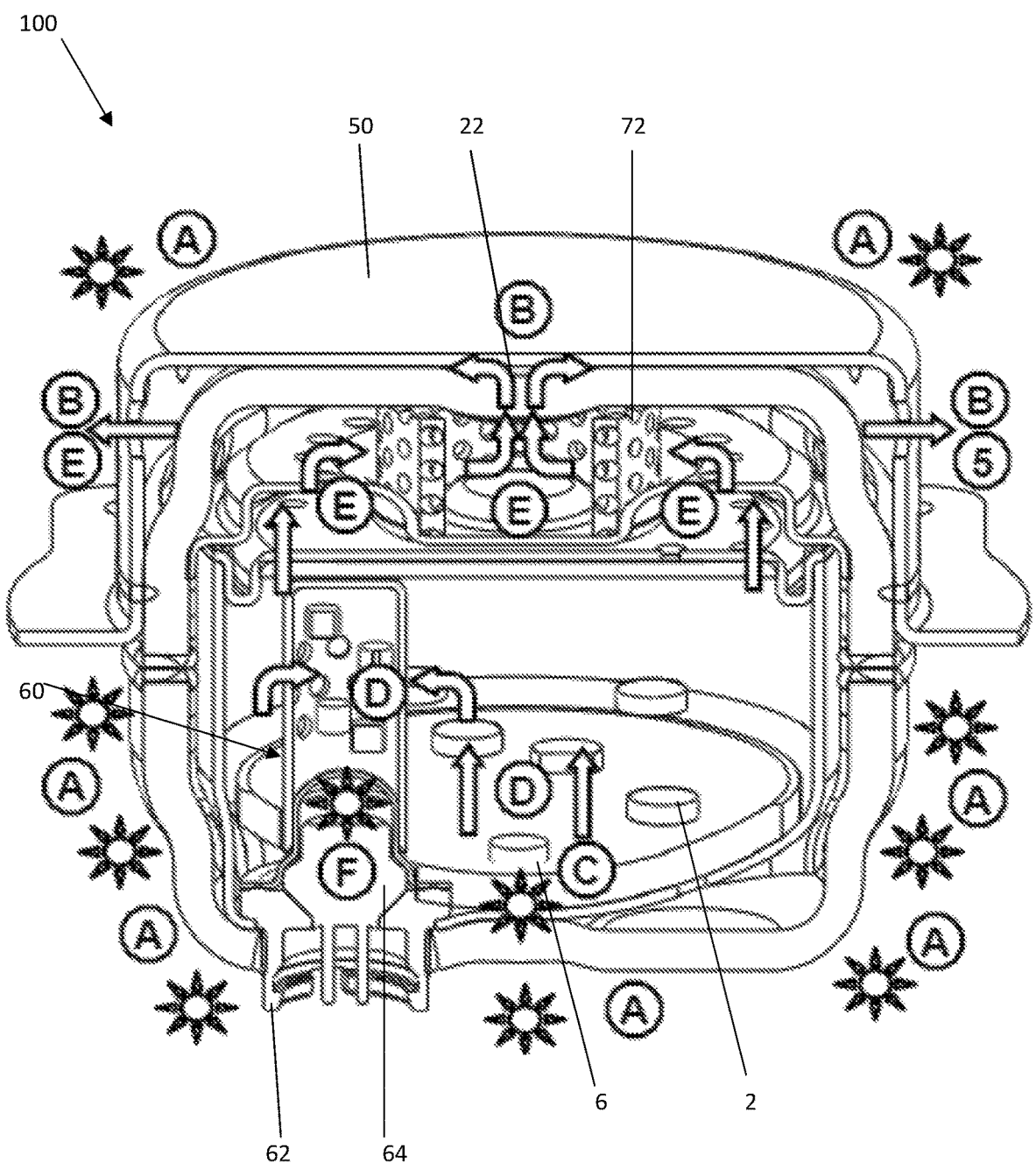
FIG. 7 is a sequential depiction of the inflator of FIG. 1 illustrating sequentially an autoignition of the device when exposed to high temperatures as in a fire.
Figure 8:
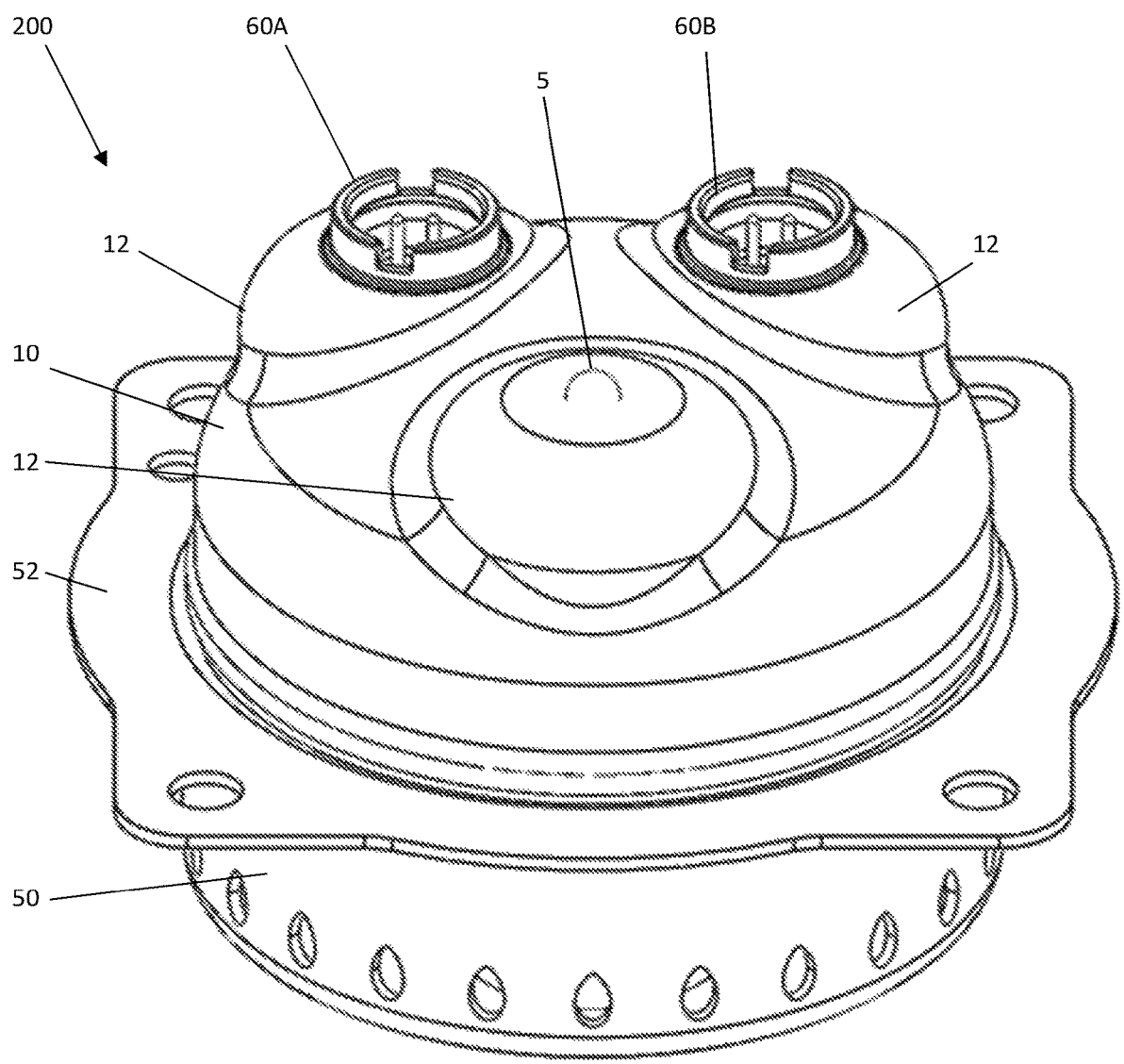
FIG. 8 is a second embodiment of the invention showing a perspective view of a dual stage inflator made in accordance to the present invention.
Figure 9:
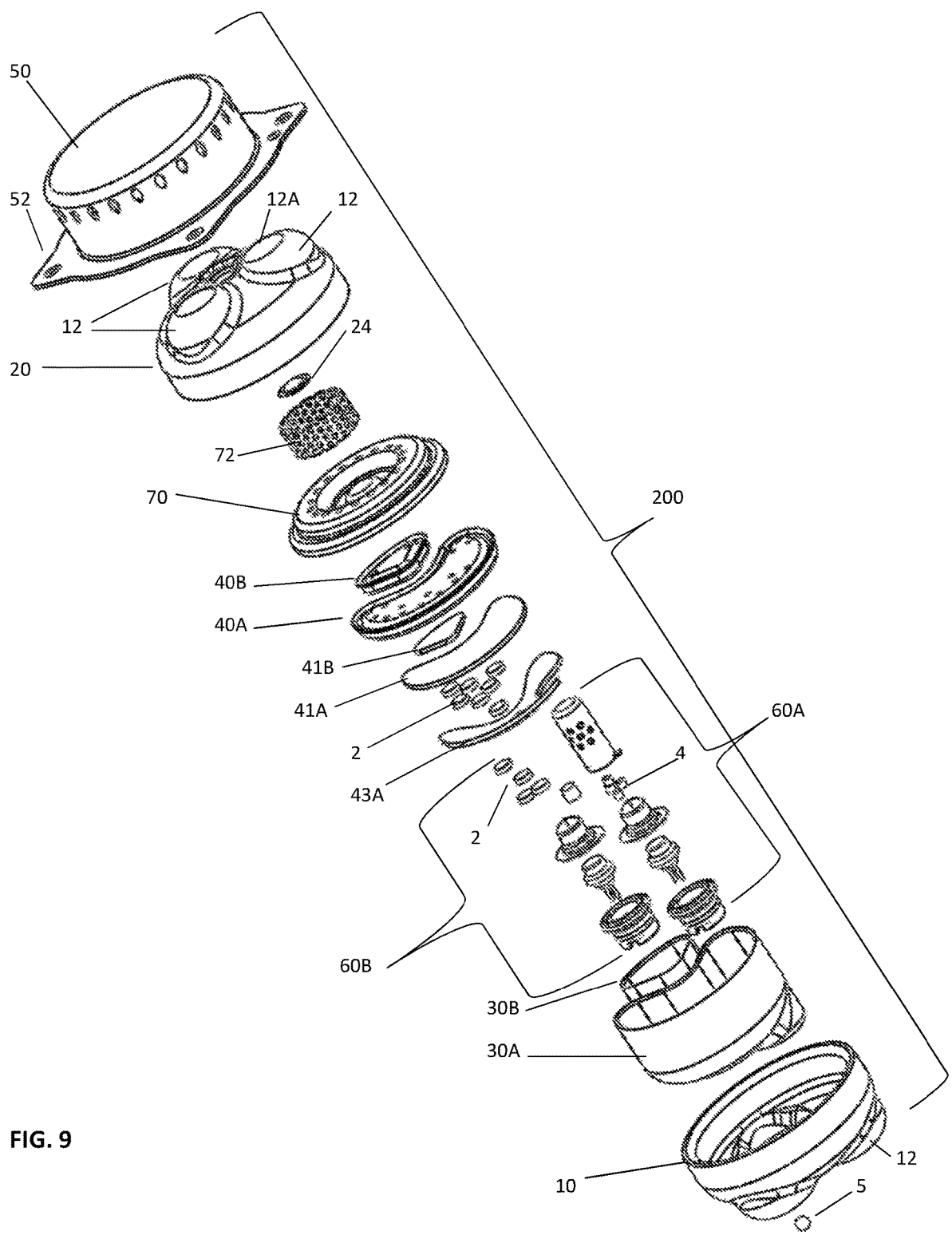
FIG. 9 is an exploded perspective view of the dual stage inflator showing the various components of the inflator of the present invention.

A unique safety feature of the present invention is illustrated in FIG. 7. The inflator 100 when exposed to excessive temperatures in the event of a warehouse fire or shipping fire or any excessive heat will safely release ignition and stored gases. External heat shown by location A is transferred thru the inflator structure B to the internal stored gas 1. Internal gas pressure increases until burst disk 24 ruptures, releasing stored gas 1. The structure continues heating up transferring heat C to autoignition tablet 6 until ignition occurs. The autoignition tablet 6 ignites gas generant tablets 2, and enhancer tablets 4 location D. All pyro gasses are ignited and exit E inflator 100 through burst disk orifice 24 exhaust port 22 (1-2 min after gas). In case of a dual stage inflator 200 autoignition, secondary igniter 5*a* is deployed by primary stage ignition. Thermal soak eventually reaches F igniter autoignition temperature (3-5 min after pyro).

As shown in the embodiments of FIGS. 1-7, the inflator 100 employs a domed lower body portion 10 and a domed upper housing portion 20 that are virtually identical with the exception of the exhaust port 22 centrally located in the domed upper housing portion 20. Additionally, these thin walled metal structures are butt welded together to make the housing body structure. Interestingly, the dome shape of the body portions 10, 20 provides a unique opportunity to stabilize the inflator 100 during the assembly of the components. As shown, the protrusions extending from the dome shaped top of the inflator 100 provide a stable platform upon which the inflator can sit during assembly of the various components. These protrusions 12 on the inflator 100 act as legs having a flat horizontal surface that can be used for vertically supporting the lower body portion 10 or domed upper housing portion 20 during the assembly operation.

As shown in FIG. 1, the domed lower body portion 10 has three protrusions 12, one protrusion 12 is a gas fill port with a hole for receiving the inert gas 1, which is sealed by the fill ball 5 then welded to seal the inert gas 1 under pressure thereby containing the gas. Prior to that the igniter assembly 60 can be installed and welded in the lower body portion 10. This facilitates automated manufacturing of the inflator 100 as the domed upper housing portion 20 is similarly made. The differences between the domed upper and lower body portions is the way in which the protrusions 12 are used in the domed lower body portion 10 there is the fill port sealed by the fill ball 5 provided in one and there is an opening in another protrusion 12 to receive the igniter assembly 60. When the same housing or body portion component is used as a domed upper housing portion 20, all the protrusions 12 have the ends intact or closed, a central hole exhaust port 22 is drilled into the domed structure between the protrusions 12 along the center axis of the domed upper housing portion 20. The three protrusions 12 in combination with the dome structure between the protrusions 12 provide a unique profile which, as shown in FIG. 6, that helps contain the baffle structure 70 and perforated ring 72 securely as an assembly. When comparing FIG. 5 to FIG. 6, one notes the baffle in the cross section through the igniter assembly 60 is contained by a recess or flange that sits over the gas generant chamber and helps seal the cap and the baffle 70 to the structure. However, a large air pocket is created between the baffle 70 and the inner surface of the domed upper housing portion 20 to allow gas flow. However, between the protrusions 12, the dome shape is substantially lower, as a result the domed upper housing portion 20 in at least three locations to be contacting and pressing against the domed upper housing portion of the baffle 70 as illustrated in FIG. 6. This localized compression against the baffle 70 helps secure it and maintain its shaped by during the explosion created during the ignition pressure created by the burning gas generant pellets and release of the inert gases. In the view in FIG. 6, the housing is not only contacting along an outer lip or rim of the baffle 70 and the cap, it is also providing three points of contact rigidly holding the baffle in place preventing it from deflecting. Similarly, the baffle 70 has a depression 75 in the center that provides some structural stiffening resistance creating a rigid baffle structure, that when assembled, creates a uniquely strong assembly even though the materials are relatively thin walled and light.

With reference to FIGS. 8-14, the dual stage inflator 200 is shown as a second alternative embodiment using many of the same components of the single stage inflator 100 shown in FIGS. 1-7. In this embodiment, there are two igniter assemblies 60A, 60B. As shown, the igniter assembly 60A is identical to the igniter assembly 60 of the inflator 100. However, the igniter assembly 60B is a secondary chamber that provides a dual stage capability hybrid inflator 200. This second igniter assembly 60B has the inflator cap 66, an igniter 64 and gas generant pellets 2 contained within the chamber 30B. As shown in the exploded view of FIG. 9, below the igniter assemblies 60A, 60B, is a primary gas generant chamber 30A and a second stage generant chamber 30B that fit into the lower body portion 10 as illustrated.

Figure 10:
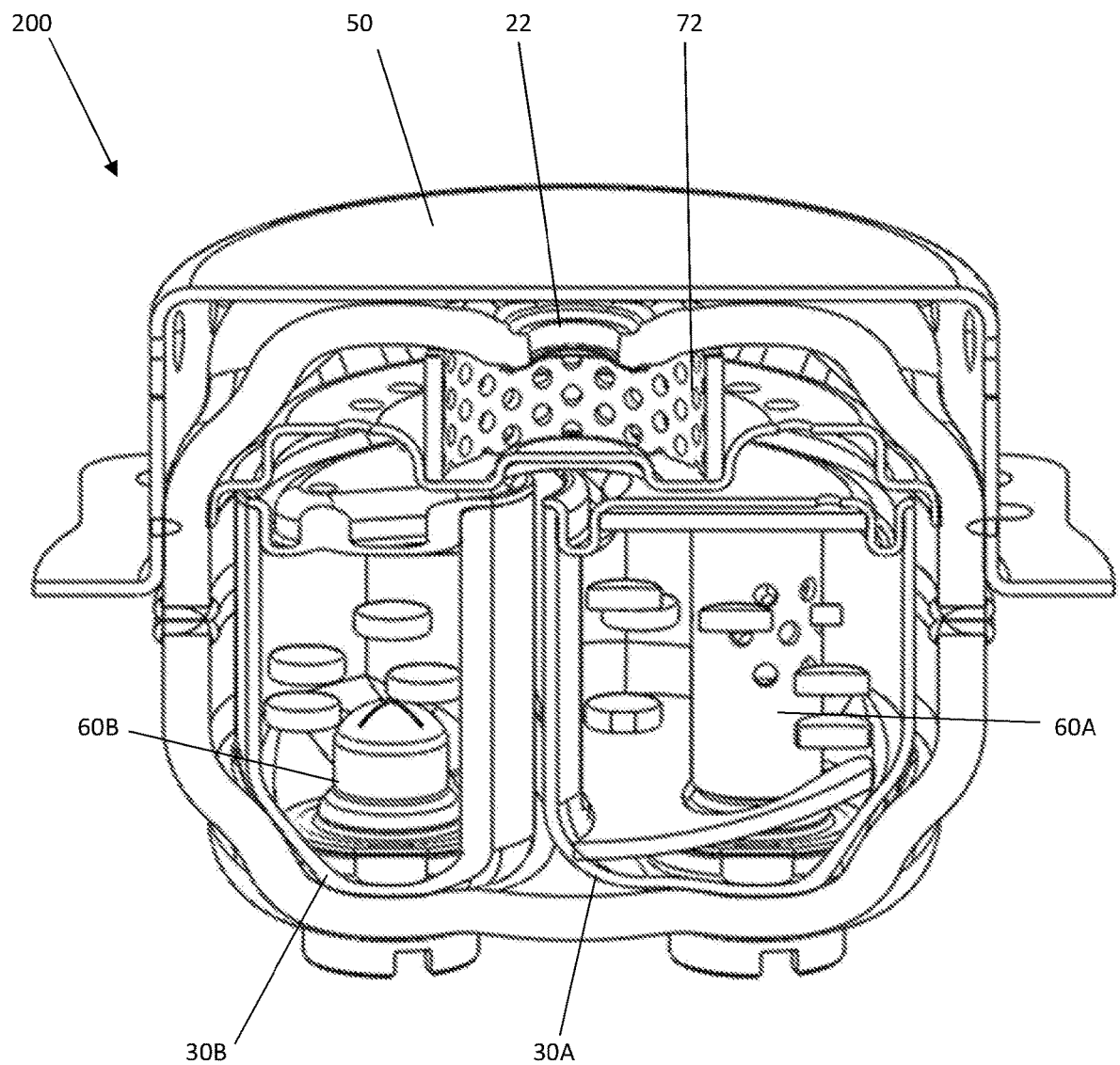
FIG. 10 is a cross-sectional perspective view of the inflator of FIG. 8 taken along a center plane through an axis A of the device.
Figure 11:
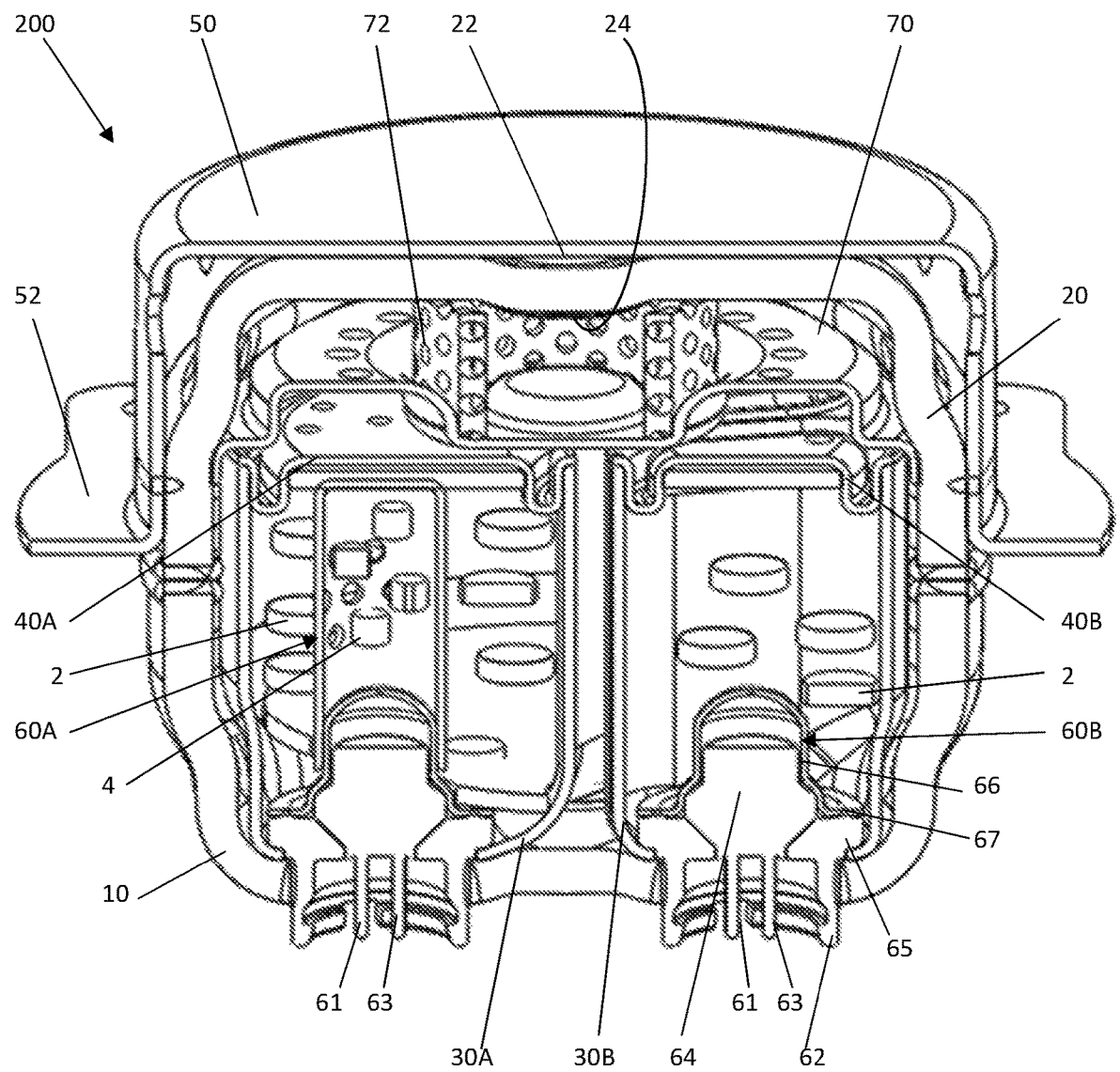
FIG. 11 is a second cross-section view of the inflator of FIG. 8 taken along a plane passing through an igniter of the inflator offset form the inflator axis.

With reference to FIG. 10, the two generant chambers 30A, 30B can be seen containing the igniter assemblies. The primary chamber 30A contains the primary igniter assembly 60A and the secondary chamber 30B contains the second igniter assembly 60B. As previously shown, a center cross section cut shows the exhaust port 22 with all the same components previously described with the exception of the generant cap 40 and cap foil 41 being slightly modified in such a way that they are also provided in two components 40A, 40B and cap foil 41A, 41B separated by the gas generant chambers 30A, 30B. Cushion layer 43A is shown or at least the larger chamber 30A.

Figure 12:
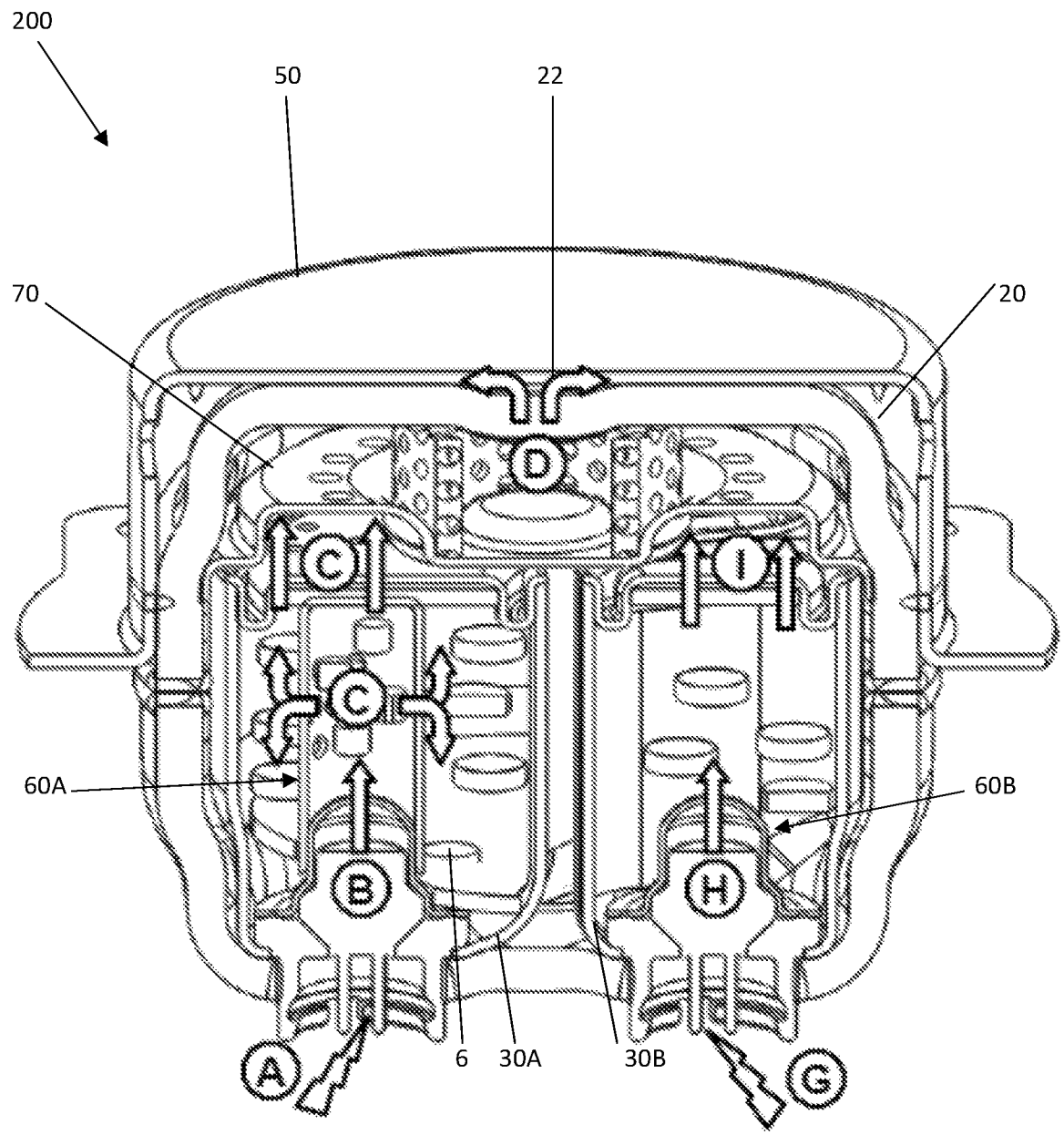
FIG. 12 is the same view as FIG. 11 with the ignition sequence shown depicting the sequential timing of the device when activated, the arrows showing the direction of gas flow.
Figure 13:
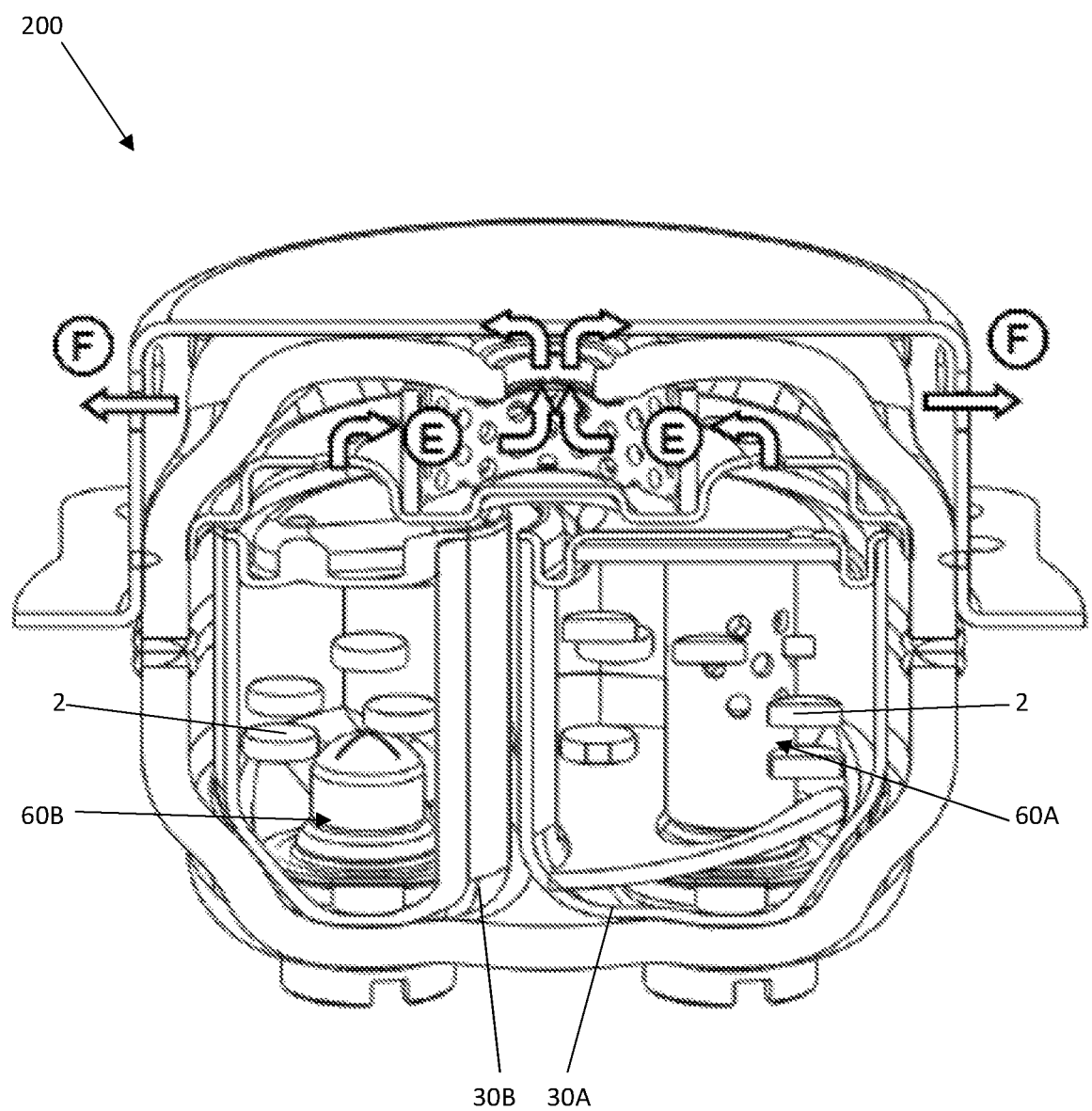
FIG. 13 is the view of FIG. 10 showing the gas flow directed to the exit port and through the opening flowing out of the diffuser when activated.

FIGS. 12 and 13 shown the progression of the gas as a signal is generated.

A signal or electrical current is applied to primary igniter 60A by control module A. Primary igniter blast opens igniter cap 66 and ignites enhancer material 4 in step B. Burning enhancer ignites primary gas generant tablets 4, & heats stored gas 1. Internal pressure increases to rupture cap foil 41 in C and burst disk 24 in D and release stored gas. Pyro generated gasses pass through cap 40, baffle 70, perforated ring 72 and exit through controlling orifice exhaust port 22. All gasses are redirected to radial flow thru diffuser 50 and into airbag (or other application). Secondary stage igniter 60B may be deployed G depending on output requirements. Secondary igniter 60B blasts open igniter cap 66 step H and ignites secondary gas generant tablets 2. Secondary pyro gasses, step I, exit inflator 200 same as primary pyro gasses E, F in FIG. 13.

Figure 14:
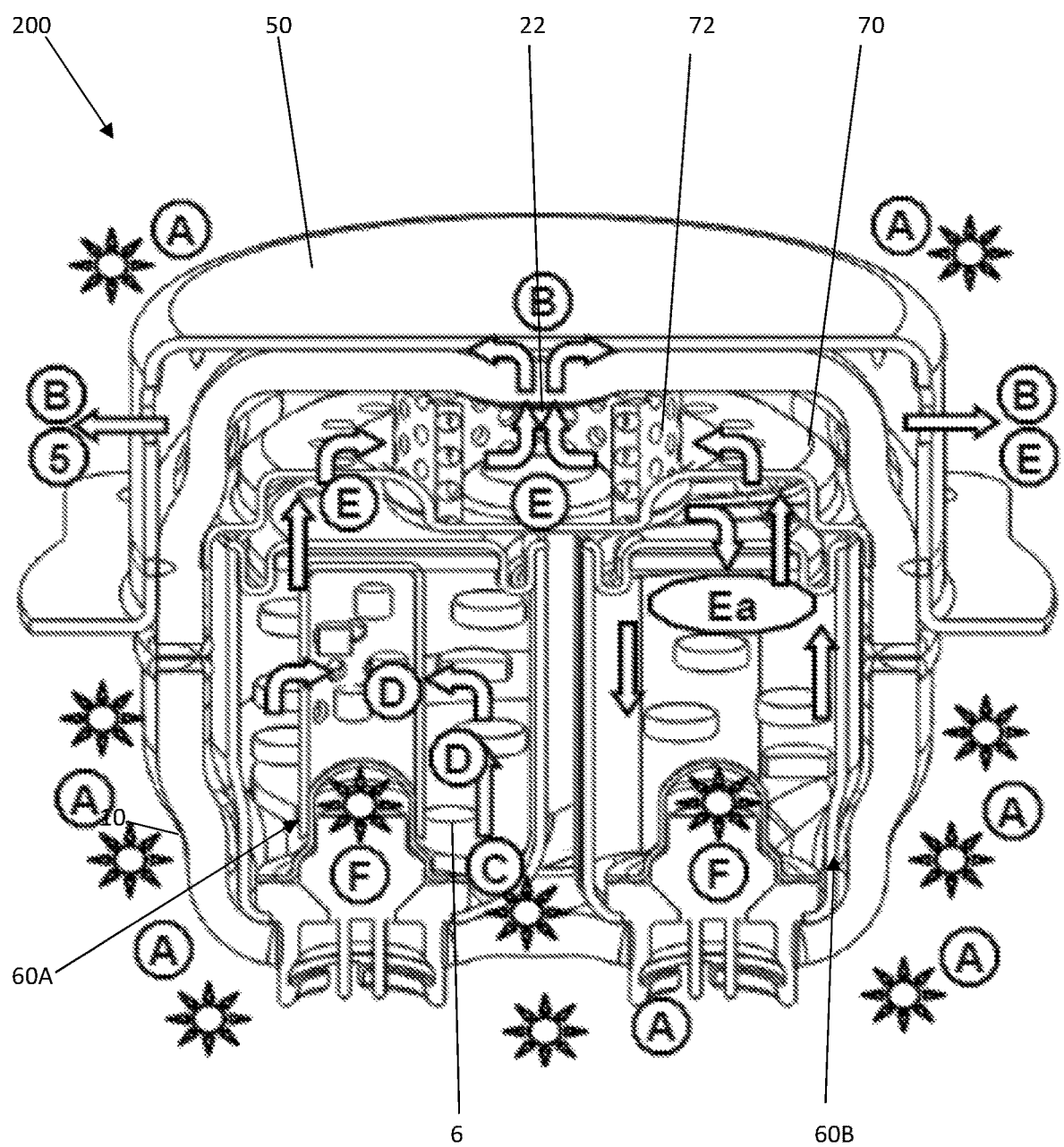
FIG. 14 is a sequential depiction of the inflator of FIG. 8 illustrating sequentially an autoignition of the device when exposed to high temperatures as in a fire.
Figure 15:
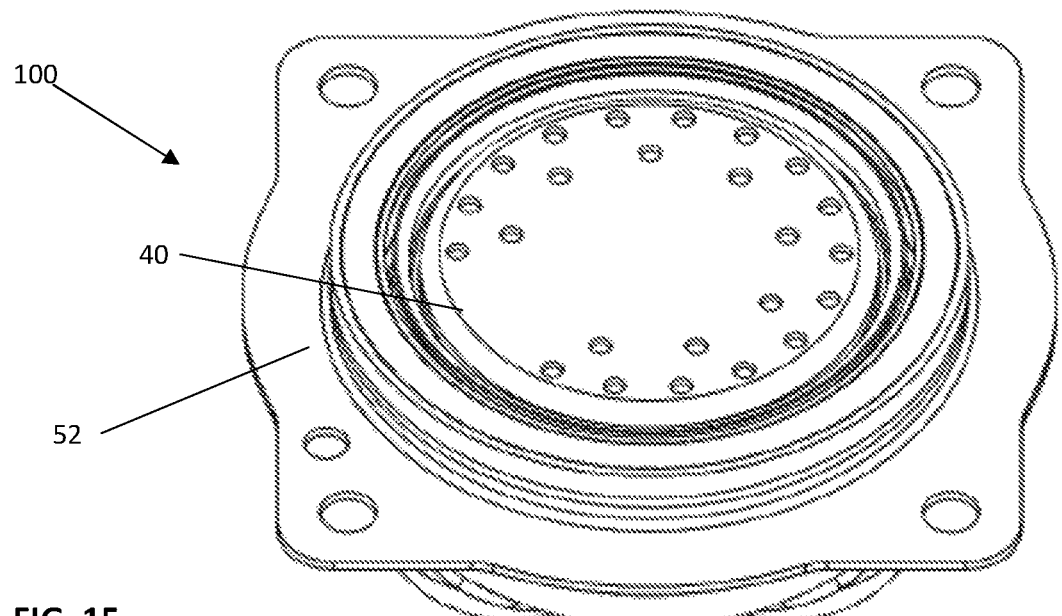
FIG. 15 is a view showing the top of the generant cup of the single stage first embodiment.

As shown in FIG. 14, the same safety feature using the autoignition tablet 6 to initiate release of the generant and gases in the hybrid inflator 200 is provided. In this case, the auto ignition tablet 6 is provided in the primary chamber 30A and when excessive heat is created, the inflator 200 will discharge all of the propellants safely.

For a better appreciation of the invention, the single stage inflator 100 is illustrated with the diffuser and flange surrounding the generant cap 40. With reference to FIG. 16, the second embodiment inflator 200 is illustrated where there is a primary generant chamber 30A under cap 40A and a secondary generant chamber 30B under cap 40B. In order to adjust the volume of the first primary stage relative to the second stage, alternative cap constructions can be provided. In the first embodiment of the dual stage inflator 200, the primary generant chamber 30A occupies approximately 270 degrees with the secondary chamber occupying about 90 degrees of circumference. In a modified version embodiment 200A shown in FIG. 17, an enlarged secondary generant chamber 30B occupies approximately 120 degrees and a reduced primary chamber occupies 240 degrees of circumference. The embodiment in 200B illustrates the primary and secondary generant chambers 30A, 30B being equally sized. These variations in structure all can occur using the same inflator body portions making the design simple and tunable for a variety of applications.

As shown throughout the various embodiments, the most beneficial feature of the present invention is the three protrusions 12 that enable the inflator to stand on the flat or horizontal ends 12A of the protrusions 12 during assembly which facilitates automated manufacturing significantly and reduces cost of assembly of the inflator. Variations in the number of and size and shape of the device can occur without altering the spirit and scope of the present invention with it being understood that a variety of primary and secondary generant chambers are capable of being used to allow for a tuning of the propellants and the proportions of first and second stage operation. And, importantly, the same device can be used as a simple single stage inflator 100 all provided with inert gases to provide a unique hybrid inflator assembly.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A hybrid airbag inflator comprises:
a disk-shaped pressure vessel having a central axis with a domed upper housing portion with a sealed exhaust port for releasing inflation gases and a domed lower body portion welded to the domed upper housing portion, the domed lower body portion having one or more protrusions extending from an outer or exterior surface positioned offset from the center axis, at least one of the protrusions housing an igniter assembly with accessible electrical connections; and
wherein the disk-shaped pressure vessel contains gas generant pellets and a quantity of pressurized inert gas for inflating an airbag;
wherein the domed lower body portion has three of the protrusions equally spaced apart at 120 degrees around and offset from the axis, each of said three protrusions extending vertically from the outer or exterior surface by a vertical distance equal to the other protrusions forming a petaloid;
wherein the domed upper housing portion has three protrusions equally spaced apart at 120 degrees around and offset from the axis, each of said three protrusions extending vertically from the outer or exterior surface by a vertical distance equal to the other protrusions forming a petaloid.

2. The hybrid airbag inflator of claim 1 further comprises:
a diffuser cap for receiving and encircling the domed upper housing portion, the diffuser cap being fixed to the pressure vessel and having a perforated circular wall, a closed top and a mounting flange for attaching the pressure vessel to a vehicle structure.

3. The hybrid airbag inflator of claim 1 wherein the inert gas comprises is typically a mixture of Argon and Helium.

4. The hybrid airbag inflator of claim 1 wherein the three protrusions extending from the domed upper housing portion of the inflator provide a stable platform upon which the inflator can sit during assembly.

5. The hybrid airbag inflator of claim 1 wherein the three protrusions extending from the domed lower housing portion act as legs having a flat horizontal surface that can be used for vertically supporting the domed lower body portion during assembly.

6. The hybrid airbag inflator of claim 1 further comprises a fill ball, the fill ball is used to seal a fill opening or port on the domed lower body portion.

7. The hybrid airbag inflator of claim 6 wherein the fill ball is made of a metal material that is resistance welded to the domed lower body portion after the inert gas is placed into the inflator under high pressure.

8. The hybrid airbag inflator of claim 1 is a dual stage inflator having two of the igniter assemblies, one being in a primary gas generant chamber and the other igniter assembly being in a second stage generant chamber, both chambers fitting into the lower body portion.

9. The hybrid airbag inflator of claim 8 wherein the primary generant chamber occupies approximately 270 degrees with the secondary chamber occupying about 90 degrees of circumference.

10. The hybrid airbag inflator of claim 8 wherein an enlarged secondary generant chamber occupies approximately 120 degrees and a reduced primary chamber occupies 240 degrees of circumference.

11. The hybrid airbag inflator of claim 8 wherein the primary and secondary generant chambers being equally sized.

12. The hybrid airbag inflator of claim 1 further comprises a generant chamber with an open tube for receiving the igniter assembly, the open tube being aligned with an opening of one of said three protrusions extending from the outer or exterior surface of the lower housing.

13. The hybrid airbag inflator of claim 12 wherein the igniter assembly comprises an igniter holder for receiving an igniter, an igniter cap, an enhancer chamber and enhancer tablets.

14. The hybrid airbag inflator of claim 13 wherein the igniter holder is laser welded or otherwise affixed to the generant chamber.

15. The hybrid airbag inflator of claim 14 wherein the igniter has a pair of electrical connectors which are provided to connect to an electrical wiring connection to receive an electrical current when the inflator is activated causing the ignitor to fire a small propellant charge stowed in the igniter.

16. The hybrid airbag inflator of claim 15 wherein the igniter cap encircles and holds the igniter and is resistance welded or otherwise affixed along flanged surfaces to the igniter holder securely fixing the igniter.

17. The hybrid airbag inflator of claim 16 wherein the enhancer tablets are stowed inside the enhancer chamber above the igniter cap, the enhancer tablets are small charges of combustible material used to ignite gas generant tablets stored inside the generant chamber.

18. The hybrid airbag inflator of claim 17 wherein for sound dampening and noise suppression, a lower cushion of material is provided that sits in the bottom of the gas generant chamber.

19. The hybrid airbag inflator of claim 18 further comprises an upper cushion of material, the gas generant being compactly packed between the upper cushion of material and the lower cushion of material to minimize rattling.

20. The hybrid airbag inflator of claim 19 further comprises an autoignition tablet that is also placed in the generant chamber, the autoignition tablet is a safety feature that will ignite when the inflator is exposed to a high temperature such as a fire, when the autoignition tablet ignites, it sets off the gas generant tablets and the enhancer tablets to prevent a premature explosion.

21. The hybrid airbag inflator of claim 19 wherein above the upper cushion is a generant cap with a plurality of holes sealed by a rupturable disk of cap foil, the cap foil seals the holes of the cap and the gas generant chamber when the generant cap is pressed onto the generant chamber.

22. The hybrid airbag inflator of claim 21 wherein above the generant cap is a baffle, the baffle has an elevated ring with a plurality of openings or holes.

23. The hybrid airbag inflator of claim 22 wherein in a depression formed by the elevated ring is placed a perforated ring with a cylindrical wall with a large number of holes, the center opening of the perforated ring being set over a small centering protrusion of the baffle.

\* \* \* \* \*